Nov. 18, 1924. 1,515,747
J. F. O'CONNOR
FRICTION SHOCK ABSORBING MECHANISM
Original Filed Dec. 2, 1920   2 Sheets-Sheet 1
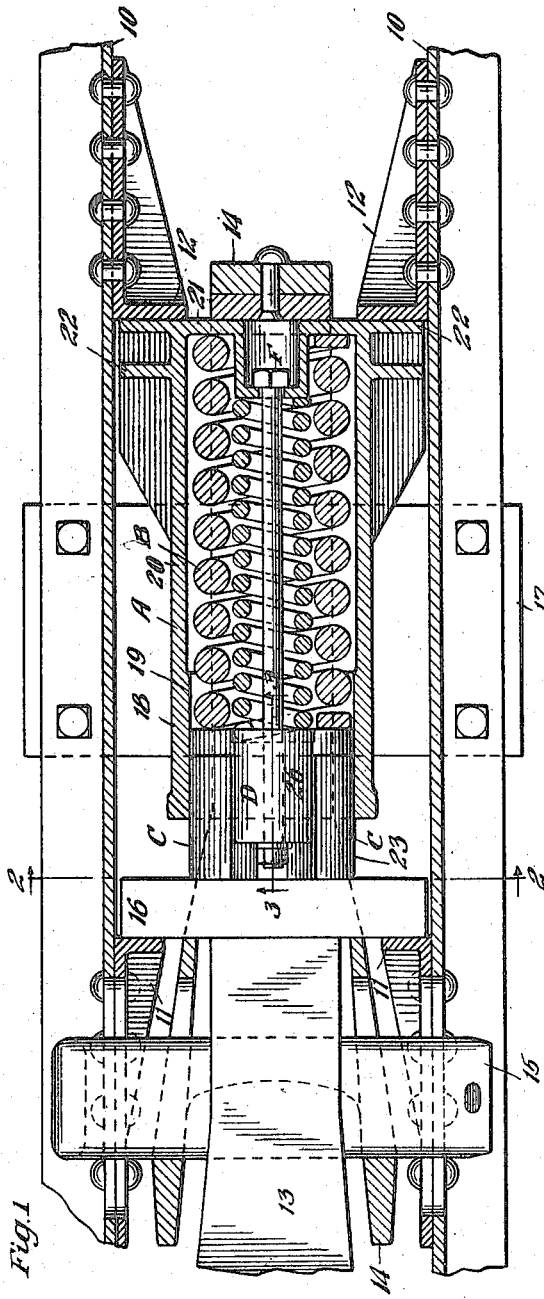
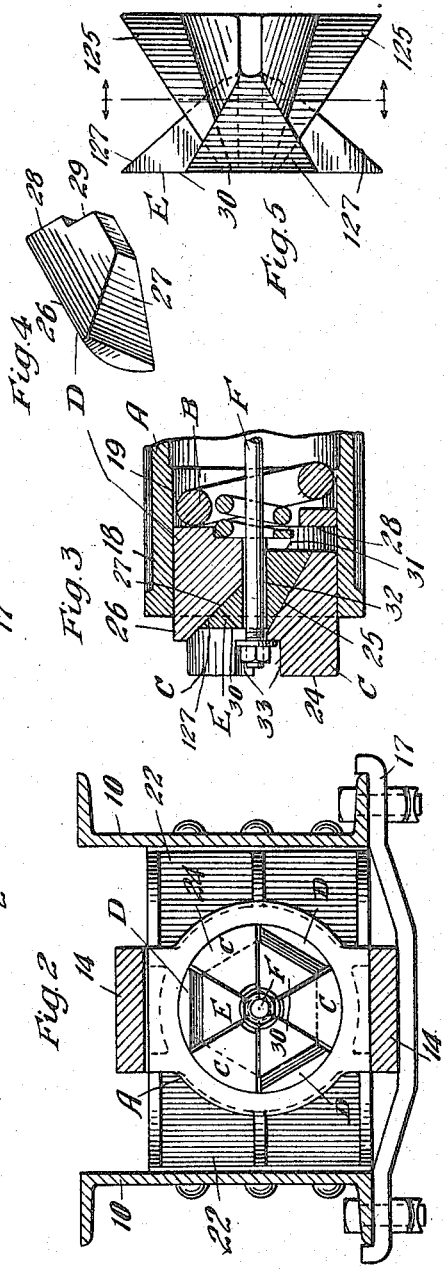
Witnesses
Wm. Geiger
Inventor
John F. O'Connor
By Geo. I. Haight
His Atty.

Nov. 18, 1924.

J. F. O'CONNOR 1,515,747

FRICTION SHOCK ABSORBING MECHANISM

Original Filed Dec. 2, 1920    2 Sheets-Sheet 2

Witnesses
Wm. Geiger

Inventor
John F. O'Connor
By Geo. I. Haight
His Atty

Patented Nov. 18, 1924.

1,515,747

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 2, 1920, Serial No. 427,735. Renewed April 10, 1924.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings wherein high capacity and certain release are obtained and the friction unit proper so designed as to occupy a comparatively small volume and produce a uniform distribution of pressure on the cooperating friction surfaces of the friction shell and shoes.

Figure 6:
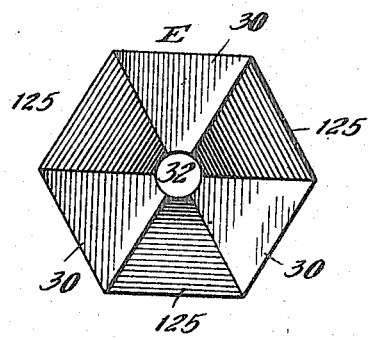
Figure 7:
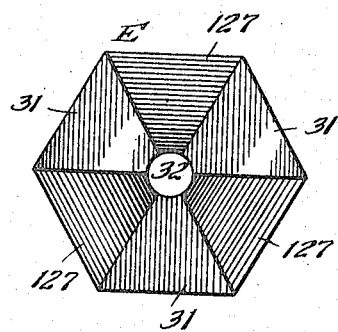
Figure 8:
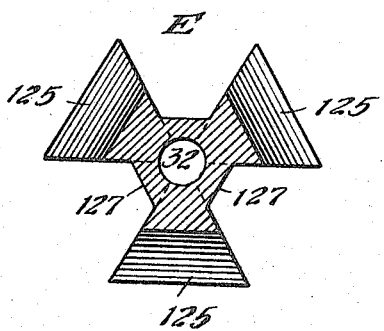
Figure 9:
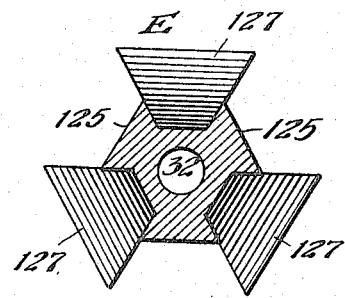

In the drawings forming a part of this specification, Figure 1 is a longitudinal, horizontal, sectional view of a portion of a railway draft rigging showing my improvements in connection therewith. Figure 2 is a vertical, transverse, sectional view corresponding substantially to the line 2—2 of Figure 1. Figure 3 is a broken, sectional view of the shock absorbing mechanism proper corresponding substantially to the line 3—3 of Figure 1. Figure 4 is a perspective view of one of the friction shoes employed in the construction. Figure 5 is a side elevational view of the wedge of the friction unit. Figures 6 and 7 are opposite end elevational views of the wedge of the friction unit. And Figures 8 and 9 are sectional views of the wedge taken on the section line indicated in Figure 5, Figure 8 being in a direction looking to the right and Figure 9 in a direction looking toward the left, as viewed in Figure 5.

In said drawings, 10—10 denote channel draft sills of a railway car, to the inner faces of which is secured the usual type of front and rear stop lugs 11 and 12. A portion of the drawbar is indicated at 13, the same being operatively connected to a hooded cast yoke 14 by means of the coupler key 15. The shock absorbing mechanism proper, hereinafter described, is mounted within the yoke and also a front follower 16. The yoke and parts therein are supported by a detachable saddle plate 17.

The shock absorbing mechanism proper, as shown, comprises, broadly, a combined friction shell and spring cage casting A; a spring resistance B; three outer friction shoes C—C; three inner friction shoes D—D; a compound wedge E; and a retainer bolt F.

The casting A has the friction shell proper 18 formed at the forward end thereof, said shell having a cylindrical inner friction surface 19. The spring cage is also of generally cylindrical form as indicated at 20 and has an integral rear wall 21, the shell having lateral extensions as indicated at 22 adapting the casting to cooperate with the rear stop lugs 12. The main spring B is of the usual form having an outer heavy coil and an inner nested lighter coil. The rear or inner ends of the spring coils bear against the rear of the casting A and at their forward ends, the coils bear against the inner set of friction shoes D.

The outer friction shoes C—C, three in number, are spaced uniformly around the axis of the shell, that is, at 120° center to center. Each of said shoes C has an outer cylindrical friction surface 23 adapting it to cooperate with the cylindrical friction surface 19 of the shell. Each shoe C also has an outer flat pressure-receiving face 24 in engagement with the follower 16 and a flat wedge face 25 extending at a relatively acute angle with respect to the axis of the mechanism. The inner friction shoes D—D are also spaced uniformly around the axis of the shell and each has an outer cylindrical friction surface 26 cooperable with the surface of the shell and a wedge face 27 extending at a comparatively blunt angle with respect to the axis of the shell. The inner ends of the shoes D provide bearing faces as indicated at 28 and 29 for the outer and inner coils, respectively.

The wedge E is formed with three rearwardly diverging friction surfaces 125—125 equi-distantly spaced and the angle of which corresponds to the angle of the wedge faces 25 of the outer shoes C. In addition, the wedge E is formed with three outwardly diverging wedge faces 127—127 also equi-distantly spaced and the angle of which corresponds to the angle of the wedge faces 27 of the inner shoes D. As will be clearly evident from an inspection of Figures 5 to 9, the wedge faces 125 are alternated with the wedge faces 127 circumferentially around the wedge and furthermore, said wedge faces 125 and 127 overlap each other longitudinally which in turn permits the shoes C and D to be longitudinally overlapped, thus providing a very compact friction unit with substantially continuous cylindrically arranged friction surfaces cooperable with the cylindrical surface 19 of the shell. It will be noted that the outer set of friction shoes C produces outwardly directed radial forces uniformly spaced around the shell and the same is true of the inner set of friction shoes D. With the construction of wedge E described, it will be noted that three triangular flat faces 30—30 will be formed at one end of the wedge and three similarly shaped flat faces 31—31 at the opposite end thereof, the faces 30 and 31 being however angularly offset 60°.

The wedge E is centrally cored as indicated at 32 to accommodate the retainer bolt F and the outer shoes C are notched as indicated at 33 to accommodate the nut of the bolt and washer as clearly indicated in Figure 3.

Not only am I enabled to obtain a very compact friction unit as above described but by employing one set of relatively keen angled wedge faces 25 and 125, I am enabled to obtain high frictional capacity and at the same time insure certain release by the employment of the other set of relatively blunt wedge faces 27 and 127.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a friction shell having interior friction surfaces; of a spring resistance; and a friction unit cooperable with said shell and spring resistance, said unit comprising, an outer set of three friction shoes, an inner set of three friction shoes, and a single wedge interposed between and cooperable with both sets of friction shoes, said wedge and sets of shoes having cooperable sets of wedge faces, the inner ends of the outer set of shoes longitudinally overlapping the outer ends of the inner set of shoes, the wedge faces of the outer set of shoes and wedge being arranged at one angle relative to the axis of the shell and the wedge faces of the inner set of shoes and wedge being arranged at a different angle relative to the axis of the shell.

2. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, each set of shoes comprising three shoes, the three shoes of the outer set and the wedge having cooperable rearwardly diverging wedge faces equi-distantly spaced, and the three shoes of the inner set and the wedge having cooperable wedge faces diverging outwardly of the shell, equi-distantly spaced and alternated circumferentially with said wedge faces of the outer set of shoes and wedge, the shoes of one set being angularly offset approximately 60° with respect to the shoes of the other set.

3. In a friction shock absorbing mechanism, the combination with a friction shell having interior friction surfaces; of a spring resistance; and a friction unit cooperable with said shell and spring resistance, said unit comprising, an outer set of friction shoes, an inner set of friction shoes, and a single wedge interposed between and cooperable with both sets of friction shoes, each set of shoes comprising three shoes, the three shoes of the outer set and the wedge having cooperable rearwardly diverging wedge faces equi-distantly spaced, and the three shoes of the inner set and the wedge having cooperable wedge faces diverging outwardly of the shell and equi-distantly spaced, the shoes of one set being angularly offset approximately 60° with respect to the shoes of the other set, the cooperating wedge faces of the iner set of shoes and wedge extending at a different angle with respect to the axis of the shell than and alternated circumferentially with the cooperating wedge faces of the outer set of shoes and wedge.

In witness that I claim the foregoing I have hereunto subscribed my name this 13th day of Nov., 1920.

JOHN F. O'CONNOR.

Witnesses:
 META SCHMIDT,
 UNA C. PERIN.